United States Patent Office 2,764,509
Patented Sept. 25, 1956

2,764,509

HOT MELT COMPOSITIONS COMPRISING A THERMOPLASTIC RESIN AND A 2-(LONG CHAIN ALKYL) GUANAMINE AND PAPER COATED THEREWITH

Daniel D. Ritson, Riverside, and Joseph C. Pullman, Stamford, Conn., assignors to American Cyanamid Company, New York, N. Y., a corporation of Maine No Drawing. Application October 13, 1954, Serial No. 462,096

5 Claims. (Cl. 117—155)

The present invention relates to novel hot-melt resinous organic coating compositions suitable for application to paper, and further relates to paper and other cellulosic webs and products coated therewith. More particularly, the present invention relates to hot-melt organic coating compositions containing a small but effective amount of a 2-(long chain alkyl) guanamine dissolved therein as agent inhibiting the adhesion or "blocking" together of paper coated therewith.

A wide variety of hot-melt coatings for paper are known. In general, they consist of a solvent-free, water-free thermoplastic resin or resinous composition which is water-insoluble and which has a flow point or viscosity of less than about 20,000 centipoises at 375° F., this being about the maximum viscosity at which a hot-melt coating can be applied to paper by any present-day machine. The compositions are required to be apparently solid at maximum temperatures at which paper is stored or used (100°–130° F.) but may have softening points so low that they flow at 150°–160° F. More often, their flow points are in the range of 190°–250° F., and in practice most compositions have a viscosity of less than 2,000 centipoises at 250° F.

In many instances, the coating compositions consist of a single thermoplastic water-insoluble film-forming resin having a flow point within the temperature range mentioned, or the composition may be a mixture of two or more of such resins. For this purpose, the thermoplastic alkyl resins, rosin-modified alkyl resins, polyethylene, and cellulose ethers and esters including ethyl cellulose, and cellulose acetobutyrate, have long been employed, as well as polyvinyl acetate, vinyl acetate-vinyl chloride copolymers, the polymethyl, ethyl and propyl acrylates and methacrylates, acrylate and methacrylate copolymers, and polyvinyl butyral. In addition, there have been employed terpene-maleic anhydride-polyhydric alcohol resins such as those known as Petrex resins Nos. 5 and 7.

Frequently, the film-forming properties of the foregoing resinous materials are assisted by the presence of auxiliary film-forming agents such as rosin, hydrogenated rosin, ester gum, maleated rosin, shellac, petroleum resins, indene-cumarone resins, terpene resins, gum dammar, kauri, elemi, chlorinated diphenyls, aryl sulfonamide resins, etc. Typically from about 25% to 75% of one or more of these auxiliary film-forming agents is used, based on the weight of the primary film-forming material or materials, but in particular instances, a greater or smaller proportion may be present. Moreover, when well plasticized, numerous of these materials may be used as the primary film-forming agent.

Moreover, the coating compositions (either with or without the film-forming agents) may contain a minor amount (about 5% to 25%–50% on the weight of the remainder of the composition) of one or more materials which act as fluxing agent, viscosity depressant or plasticizer so as to make the compositions less viscous and therefore, better adapted for use on high-speed coating machines and also more flexible at lower temperatures. Suitable materials for this purpose are carnauba wax, beeswax, and the microcrystalline hydrocarbon waxes of low-softening point; the lower esters of phthalic acid such as the dimethyl, diethyl, dibutyl, and diphenyl phthalates; butyl benzyl phthalate, butyl phthalyl butyl glycollate; hydrogenated castor oil; the higher fatty acid such as stearic acid, the lower esters of higher fatty acids such as butyl stearate, glyceryl monosteorate, and organic esters of mineral acids represented by diphenylmonoorthophosphate, triphenyl phosphate, and tricresyl phosphate. In addition, the coating may contain a pigment such as titanium dioxide or barium sulfate or a dye.

The ratios of constituents set forth above represent general practice, but in many instances wide departures are made therefrom depending upon the particular physical properties of the specific materials employed.

The constituents of hot-melt coating compositions are chemically inert at the temperatures employed and do not react with each other or with the paper.

New hot-melt coating compositions for paper are customarily arrived at empirically by making controlled modifications of known compositions, one primary requisite being that the compositions have a suitable viscosity at the desired application temperature. For application by doctor blade or roller coater equipment such as is commonly used commercially, the compositions preferably have a viscosity between about 500 and 1000 centipoises at application temperature, and this is determined by the use of an ordinary viscosimeter. Too low a viscosity results in uncontrolled flow of the composition over the paper during application, while too high a viscosity results in deposition of too thick or non-uniform coatings. For application by the continuous bath impregnation method the melts may be and usually are very fluid, and may have viscosities as low as 10 centipoises.

The second primary requisite is that the compositions, when applied to paper, give the paper no more than a slight tendency to adhere or block together, and this is determined by stacking and compressing the sheets, coated faces together, under a weight in a constant temperature oven, the amount of compression, the temperature of the oven and the duration of the test being determined in each instance with regard to conditions under which the paper will be stored and shipped and/or the use to which the paper will be put. The stacks of sheets are then cooled to room temperature and separated into their individual sheets, the amount of adhesion being recorded. Coatings are rated as satisfactory only if the sheets can be separated without marring the coating or tearing the paper.

Sheets of paper coated with any of the foregoing compositions block when heated sufficiently long at a sufficiently high temperature under sufficient pressure. This is principally due to the film-forming and auxiliary film-forming portions of the compositions which, even when apparently solid, are plastic and consequently more or less tacky. The fluxing agents, plasticizers and viscosity depressants, where present, are normally practically non-tacky and thus have intrinsically at most only a negligible blocking effect. Insofar, however, as they decrease the softening points of the compositions as a whole, they usually increase the tendency of the compositions to block.

It is customary to subject a new anti-blocking agent to a preliminary evaluation by preparing a series of control sheets coated with a variety of low-melting and consequently quite tacky resins, and then preparing a second series of sheets coated with the same resins which contain the anti-blocking agent. The sheets are folded so that the coated faces touch, heavily pressed between the thumb and forefinger for a few moments, and then cautiously pulled open. By noting the difference between the tackiness of coatings on the pairs of control and test sheets, a skilled operator can predict quite accurately the rating the anti-blocking agent will give in the more accurate oven test described above.

The discovery has now been made that the tendency of hot-melt resinous organic coating compositions to "block" is very greatly decreased by the presence therein of a minor amount of a 2-(long chain alkyl) guanamine having the theoretical formula:

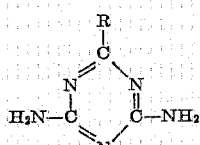

wherein R represents an alkyl group containing from 15 to 19 carbon atoms inclusive.

This discovery was most surprising because closely related compounds such as octadecyclamine, lauroguanamine, and benzoguanamine are substantially ineffective in this regard.

From the foregoing, it will be seen that the present invention is based upon the concept of applying to paper a hot-melt solvent-free thermoplastic resinous organic coating composition having dissolved therein a small amount of a 2-(long chain alkyl) guanamines as anti-blocking agent therefor, and that the hot melt compositions themselves are not particular features of the present invention. However, the principal commercial hot-melt coating compositions in present commercial use contain an ester resin, a cellulose ether, a cellulose ester, a vinyl resin, or a petroleum resin as their principal film-forming ingredient, and it is a feature of the present invention that the 2-(long chain alkyl) guanamines act very effectively as anti-blocking agents in these specific, widely used compositions.

In addition to their effectiveness as anti-blocking agents, the 2-(long chain alkyl) guanamines possess the following particular advantages:

1. They are odorless, colorless, non-volatile, non-reactive, and thermostatable. Preliminary toxicological tests indicate that these compounds are acceptable in paper.

2. They do not increase the viscosity of molten hot-melt coating compositions, and do not cause embrittlement thereof.

3. They are water-insoluble, melt in the convenient range of about 100°–130° C., and dissolve or molecularly disperse readily in molten coating compositions. When the resulting compositions are applied to paper and the coating is rapidly cooled, the 2-(long chain alkyl) guanamines largely remain dissolved or dispersed and show little tendency to crystallize out or "bloom."

4. They generally act as mutual solvents, improving the compatibility of the ingredient with development of smoother and more glossy coats.

The 2-(long chain alkyl) guanamines are known, and are readily prepared by condensing an appropriate fatty acid methyl ester with free biguanide in ethanol at room temperature. The product separates on standing. Because of the cyclization which takes place, the alkyl groups of the resulting guanamines contain one carbon atom fewer than the parent fatty acids from which the methyl esters are derived. Any long-chain fatty acid containing 16 to 20 carbon atoms may be employed as the parent raw material, such as palmitic acid (which yields 2-palmitoguanamine) and the mixed higher fatty acids obtained from hydrogenated fish oil, which predominately yield 2-eicosoguanamine. Moreover, the newer long chain fatty acid mixture derived from petroleum oxidation containing the requisite average number of carbon atoms may also be used. In practice, we prefer to use stearic acid since this acid is readily available and yields excellent results, the product being 2-stearoguanamine.

The evidence indicates that the presence of even a very minor amount of a 2-(long chain alkyl) guanamine in hot-melt coating compositions reduces the tendency of such compositions to "block" at least to some extent, and there therefore appears to be no minimum amount of the guanamine which will not produce at least some beneficial result. The optimum amount of the guanamine which need be present in any given hot-melt coating composition is a variable which depends chiefly upon the inherent tackiness of the composition and the maximum temperature and pressure to which the coating will be subjected after application to paper. Thus, in the case of any given coating composition, less of the long-chain alkyl guanamine is required in the case of coated paper stored for only a short time at winter temperature in small rolls. On the other hand, more is required in the case of paper stored for some weeks at summer temperatures in the form of jumbo rolls, in which much greater pressure is developed. The optimum effective amount in each instance can readily be determined by performing a series of laboratory oven tests as described above, it being known that paper which is non-blocking when heated at 130° F. for 16 hours under a pressure of 1 lb. per sq. inch is generally regarded as satisfactory throughout New England and the Middle Atlantic States throughout the year. As a practical matter, we have found that at least 5% to 10% of the 2-(long chain alkyl) guanamine, based on the weight of the remainder of the composition, should be added to avoid the danger of "blocking" even under the more favorable conditions of storage where comparatively block-resistant compositions are employed. On the other hand, in the case of paper coated with normally very tacky coating compositions which are subject to prolonged summer storage in jumbo rolls, we have found that the amount of the long-chain alkyl guanamine may advantageously be increased to 30% or 40% of the weight of the remainder of the composition.

Hot-melt coating compositions for paper are prepared by mixing the ingredients in a suitably heated kettle provided with a stirrer which reaches to the bottom thereof, the temperature of the vessel being sufficient to melt the ingredients as they are added. Since the ingredients are mutually non-reactive, they may be added in any order or be blended as a pre-mix. The 2-(long chain alkyl) guanamines of the present invention are substantially non-volatile and non-reactive with the aforesaid ingredients and thus may be added at any convenient point or be pre-mixed as may be found more convenient. It is an advantage of the guanamines of the present invention that even when added in the form of a coarse powder, they dissolve or molecularly disperse readily with ordinary stirring.

The more viscous hot-melt coating compositions thus formed are applied to paper by conventional methods such as a doctor blade or roller coater. In the case of very low viscosity compositions such as paraffin wax mixtures, the paper is more advantageously coated by the continuous bath impregnation method. The compositions may be delivered in molten form from the mixing kettle directly to the coating machine or bath, or the contents of the mixing kettle may be chilled on a cold rotating drum and broken up. The chilled product may then be melted and used as described. It is thus evident that the particular way in which the coating compositions are formed is not a feature of the present invention.

The invention will be more particularly illustrated by the example which follows. These examples represent specific embodiments of the invention and are not to be construed as limitations thereon. In each instance, the resins were prepared in glass vessels under nitrogen. Softening points, where given, were obtained by the A. S. T. M. E–28 42T ring-and-ball method except where otherwise stated.

RESIN A

A thermoplastic resin known to yield glossy, heat-sealing films which, however, "block" very badly was prepared as follows:

A mixture of 1000 g. of isopropylidene-bis-p-phenoxyacetic acid (prepared according to U. S. Patent No. 2,541,003), 950 g. of diethylene glycol and 50 g. of glycerol monostearate was heated for 2.5 hours at 410° F. in the presence of 4 g. of 2-naphthalene sulfonic acid as catalyst. The softening point of the resin was 135° F.

RESIN B

An oil-modified alkyd resin was prepared as follows: 1770 g. of phthalic anhydride, 1010 g. of cottonseed fatty acids, and 1160 g. of glycerol were mixed and heated to 425° F. until the mixture reached a softening point of 127° F. The mixture was then heated at 400° F. to a softening point of 137° F.

RESIN C

An alkyd modified ester gum was prepared as follows: 863 g. of phthalic anhydride, 3450 g. of wood rosin and 828 g. of glycerol were heated briefly at 540° F. and then at 500° F. to a softening point of 181° F.

RESIN D

A Diels-Alder rosin adduct was prepared as follows: 3465 g. of rosin was melted, and 907 g. of fumaric acid and 3.5 g. of p-toluenesulfonic acid catalyst added. The mixture was heated to 410° F. to a softening point of 302° F.

RESIN E

A Diels-Alder rosin ester gum was prepared as follows: 480 g. of fumaric acid, 4000 g. of gum rosin and 580 g. of glycerol were heated to 480° F. under nitrogen to a softening point of 284° F. and sparged with nitrogen to an acid number of 34.

RESIN F

An ester gum modified phenolic resin was prepared as follows:

600 g. of phenol, 840 g. of 37% formalin and 6 g. of zinc oxide were refluxed for 9 hours.

600 g. of the above condensate and 1820 g. of wood rosin were heated to 325° F. and 28 g. of fumaric acid added. The mixture was heated to 500° F. and 215 g. of glycerol added over 2 hours. The mixture was heated two more hours at 500° F. and then at 535° F. to a softening point at 275° F. and an acid number of 15.

RESIN G

The manufacture of a terpene-alkyd resin is shown as follows:

116 g. of fumaric acid and 65 g. of glycerol were heated to 284° F. in a reaction vessel fitted with a water trap, and 27 g. of alloö cimene slowly added. An exothermic reaction took place. When the temperature had dropped to 302° F. an additional 109 g. of alloöcimene was added dropwise, the trap being drained as necessary. The temperature was maintained at 302° F. to an acid number of 150 and a softening point of 162° F. To 291 g. of the product was added 10 g. of glycerol and 165 g. of refined corn oil. The mixture was heated at 401° F. to an acid number of 25.

RESIN H 148 g. of phthalic anhydride, 92 g. of glycerol and 122 g. of benzoic acid were heated to 266° F. until evolution of water substantially ceased and the product had an acid number of 31.

Example 1

2-stearoguanamine was subjected to a preliminary evaluation as anti-blocking agent by preparing a series of control sheets coated on one side to a thickness of 0.0005" with resins B–H, using glassine paper having a basis weight of 25 lb. per 24" x 36"/500 ream and Bird laboratory knife coater. These resins are representative of commercially used resins having a wide range of flow points which are prone to cause blocking. A second series of sheets was prepared in the same manner, except that the resins contained 20% by weight of 2-stearoguanamine divided therein.

The sheets were folded double, coated faces together, heavily pressed between the thumb and forefinger for a few moments, and the amount of blocking noted.

Blocking was observed in the case of the control sheets coated with resins B, C, G and H. The corresponding test sheets (containing the guanamine) either failed to block at all or exhibited much less blocking than their respective controls.

The control sheets coated with the high-softening resins D, E and F did not actually block, but exhibited a somewhat tacky "slip" when rubbed together. Such tackiness is evidence of incipient blocking. This tackiness was not present in the test sheets containing 2-stearoguanamine.

The foregoing results made it evident that 2-stearoguanamine is valuable as an anti-blocking agent.

Example 2

The effect of 2-stearoguanamine in preventing the blocking of thermoplastic resinous organic coatings under standard oven conditions is illustrated as follows.

Resin A in molten form at 300° F. was divided into a number of portions. To one, nothing was added, and this was reserved as control. To the remaining portions were respectively added the amounts of 2-stearoguanamine shown in the table below. The stearoguanamine was added as a coarse powder and readily dissolved with ordinary manual stirring.

Each of the resulting compositions were applied in molten form at a temperature of 300° F. to one side of glassine paper according to Example 1.

The sheets were tested by cutting twelve 1" squares therefrom assembling six of the squares face to face, and assembling the remaining six back to face. The pairs of square sheets were stacked alternately and placed under a 1" square steel weight weighing 1 lb. in a constant temperature oven for 16 hours at the temperatures shown in the table below. The sheets were then cooled to room temperature, separated, and the amount of blocking noted. Results for each test were averaged.

No marring or adhesion of the coatings was given a blocking rating of "none." Fusion of the coatings accompanied by marring or tearing when unfolded was given a blocking rating of "severe." The sheets were further rated visually for their gloss and tested for their ability to heat seal. Results are as follows:

| Sheet No. | Percent Guanamine | Oven Temp., °F. | Blocking Rating | Gloss | Heat Seal |
|---|---|---|---|---|---|
| 1 | Nil | 100 | Severe | Good | Good. |
| 2 | 20 | 120 | None | do | Do. |
| 3 | 30 | 130 | do | do | Do. |
| 4 | 40 | 150 | do | do | Do. |

The results show that 2-stearoguanamine is very effective as an anti-blocking agent. The temperature employed for sheet No. 4 was substantially in excess of test temperatures customarily used.

An important feature shown is that the 2-stearoguanamine, even when used in large amount, was not detrimental either to the gloss or the heat-sealing properties of the coating.

Example 3

A hot-melt coating composition was prepared by melting together the following:

|  | Grams |
|---|---|
| Disproportionated rosin | 30 |
| Hydrogenated rosin ester (Stabelite No. 10) | 150 |
| Hydrogenated castor oil (Hydrofol Ester 200) | 120 |
| Ethyl cellulose (low visc.) | 30 |
| Total | 330 |

The batch was divided into three equal portions. One portion (A) was reserved as control, and to this nothing was added. To the remaining two (B and C) were respectively added 10 gm. and 20 gm. of 2-stearoguanamine, which readily dissolved with stirring.

The three resulting compositions were applied to label paper by knife draw-down at a temperature of 250° F., and the resulting coatings tested for surface tackiness and their tendency to block by pressing the folded sheets together between the fingers. It was found that composition B was improved in this regard over the control composition A, and that composition C exhibited the least tendency to block, showing the effectiveness of 2-stearoguanamine in a composition containing ester gum and ethyl cellulose as the primary film-forming materials.

This test also demonstrated the solubilizing power of the guanamine. Compatibility of the components in composition A was so poor that the film in extensive areas was rough to the touch. The film obtained from composition B was practically free from roughness, while the film obtained from composition C was completely smooth, showing that complete compatibility of the ingredients had been achieved.

Example 4

Three hot-melt compositions were prepared as follows:

|  | Compositions, grams | | |
|---|---|---|---|
|  | A | B | C |
| Polyvinylacetate | 100 | 95 | 90 |
| 2-Stearoguanamine | Nil | 5 | 10 |

The coatings were applied to label paper and tested by finger pressure in accordance with Example 3. The paper carrying composition B showed a decreased tendency to block in comparison with the paper carrying composition A, and the paper carrying composition C was better still. The coating on the latter paper was very satisfactorily hard and glossy, and the film had good slip.

We claim:

1. A process of flowing to the surface of paper in sheet form a molten composition consisting essentially of a thermoplastic resin and a 2-(long chain alkyl)guanamine as anti-blocking agent therefor, the alkyl group of said guanamine containing 15 to 19 carbon atoms.

2. A process according to claim 1 wherein the guanamine is stearoguanamine.

3. A process according to claim 1 wherein the resin is an alkyd resin.

4. A process according to claim 1 wherein the resin is a vinyl resin.

5. A process according to claim 1 wherein the resin is an ester gum.

References Cited in the file of this patent

UNITED STATES PATENTS 2,385,765  Thurston et al. _____ Sept. 25, 1945